United States Patent
Ugaji et al.

(10) Patent No.: US 7,419,746 B2
(45) Date of Patent: Sep. 2, 2008

(54) SOLID ELECTROLYTE AND ALL SOLID STATE BATTERY USING THE SAME

(75) Inventors: Masaya Ugaji, Suita (JP); Shinji Mino, Ibaraki (JP); Yasuyuki Shibano, Hirakata (JP); Shuji Ito, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 393 days.

(21) Appl. No.: 10/553,238

(22) PCT Filed: Jun. 24, 2004

(86) PCT No.: PCT/JP2004/009299

§ 371 (c)(1),
(2), (4) Date: Oct. 14, 2005

(87) PCT Pub. No.: WO2005/001982

PCT Pub. Date: Jan. 6, 2005

(65) Prior Publication Data
US 2007/0042272 A1 Feb. 22, 2007

(30) Foreign Application Priority Data
Jun. 27, 2003 (JP) .............................. 2003-184626

(51) Int. Cl.
*H01M 6/18* (2006.01)
(52) U.S. Cl. .................... 429/322; 429/321; 429/231.9; 429/231.95; 429/252

(58) Field of Classification Search ................. 429/321, 429/322, 231.9, 231.95, 252
See application file for complete search history.

(56) References Cited

U.S. PATENT DOCUMENTS

| 5,597,660 A | 1/1997 | Bates et al. |
| 6,365,300 B1 | 4/2002 | Ota et al. |

FOREIGN PATENT DOCUMENTS

| JP | 2000-340257 A | 12/2000 |
| JP | 2002-203593 A | 7/2002 |

OTHER PUBLICATIONS

Electrochemical analysis of thin film electrolytes and electrodes for application in rechargable all solid state lithium microbattries, Electrochemica Acta. vol. 42, Nos. 20-22, pp. 3375-3384, 1997.*
Chinese Office Action, with English translation, issued in Chinese Patent Application No. CN 2004800148959, mailed Sep. 7, 2007.

* cited by examiner

*Primary Examiner*—Ben Lewis
(74) *Attorney, Agent, or Firm*—McDermott Will & Emery LLP

(57) ABSTRACT

A solid electrolyte of the present invention is represented by a general formula: $Li_xMO_yN_z$, where M is at least one element selected from the group consisting of Si, B, Ge, Al, C, Ga and S, and x, y and z respectively satisfy x=0.6 to 5.0, y=1.050 to 3.985, and z=0.01 to 0.50. The solid electrolyte hardly deteriorates in a wet atmosphere.

5 Claims, 2 Drawing Sheets

SOLID ELECTROLYTE AND ALL SOLID STATE BATTERY USING THE SAME

RELATED APPLICATION

This application is a national phase of PCT/JP2004/009299 filed on Jun. 24, 2004, which claims priority from Japanese Application No. 2003-184626 filed on Jun. 27, 2003, the disclosures of which Applications are incorporated by reference herein. The benefit of the filing and priority dates of the International and Japanese Applications is respectfully requested.

TECHNICAL FIELD

The present invention relates to an all solid state battery, particularly to a solid electrolyte used in an all solid state thin film lithium secondary battery.

BACKGROUND ART

With the development in portable devices such as personal computers and mobile phones, demand is growing for batteries as power sources for such devices.

In batteries for such application, an electrolyte composed of a liquid such as organic solvent has been used as a medium for transferring ions. For this reason, there is a possibility that problems such as leakage of electrolyte from the battery might occur.

In order to solve the above problems, development is under way to produce an all solid state battery using, instead of a liquid electrolyte, a solid electrolyte. An all solid state lithium secondary battery, in particular, is vigorously being studied in many fields as a battery capable of providing a high energy density. This is because Li has a low atomic weight, the greatest ionization tendency, and the lowest reduction potential, and thus, for example, the use of Li metal as a negative electrode active material yields a high electromotive force.

Well-known examples of the solid electrolyte used for the all solid state lithium secondary battery are lithium halide, lithium nitride, lithium oxyacid salts and derivatives thereof. For example, U.S. Pat. No. 5,597,660 reports in the specification that lithium phosphorus oxynitride ($Li_xPO_yN_z$: where x, y and z satisfy x=2.8 and 3z+2y=7.8) obtained by introducing nitrogen (N) into lithium orthophosphate ($Li_3PO_4$) has a very high lithium ion conductivity of $1\times10^{-6}$ to $2\times10^{-6}$ S/cm although it is an oxide-based material.

When the lithium phosphorus oxynitride is exposed to a wet atmosphere, however, phosphorus atoms (P) forming the lithium phosphorus oxynitride react with water molecules present in the wet atmosphere, during which the phosphorus atoms are reduced to a lower oxidation state from an oxidation state of +5. Thereby, lithium phosphorus oxynitride is decomposed, which significantly decreases the ion conductivity thereof.

When such decrease in ion conductivity occurs in an all solid state battery using a solid electrolyte composed of lithium phosphorus oxynitride, internal impedance will increase. For this reason, its charge/discharge rate characteristics will be significantly impaired.

In view of the above, an object of the present invention is to provide a solid electrolyte capable of preventing the ion conductivity from decreasing even in a wet atmosphere, and an all solid state battery using the solid electrolyte.

DISCLOSURE OF INVENTION

The solid electrolyte of the present invention is represented by a general formula: $Li_xMO_yN_z$, where M is at least one element selected from the group consisting of Si, B, Ge, Al, C, Ga and S, and where x, y and z respectively satisfy x=0.6 to 5.0, y=1.050 to 3.985, and z=0.01 to 0.50.

In the formula, it is further preferred that x=0.6 to 1.0, y=1.050 to 1.985 and z=0.01 to 0.50.

In the formula, it is further preferred that x=1.6 to 2.0, y=2.050 to 2.985 and z=0.01 to 0.50.

In the formula, it is further preferred that x=1.6 to 2.0, y=3.050 to 3.985 and z=0.01 to 0.50.

In the formula, it is further preferred that x=2.6 to 3.0, y=2.050 to 2.985 and z=0.01 to 0.50.

In the formula, it is further preferred that x=3.6 to 4.0, y=3.050 to 3.985 and z=0.01 to 0.50.

In the formula, it is further preferred that x=4.6 to 5.0, y=3.050 to 3.985 and z=0.01 to 0.50.

The present invention further relates to an all solid state battery comprising a positive electrode, a negative electrode and the aforesaid solid electrolyte disposed between the positive electrode and the negative electrode.

BEST MODE FOR CARRYING OUT THE INVENTION

Figure 1:
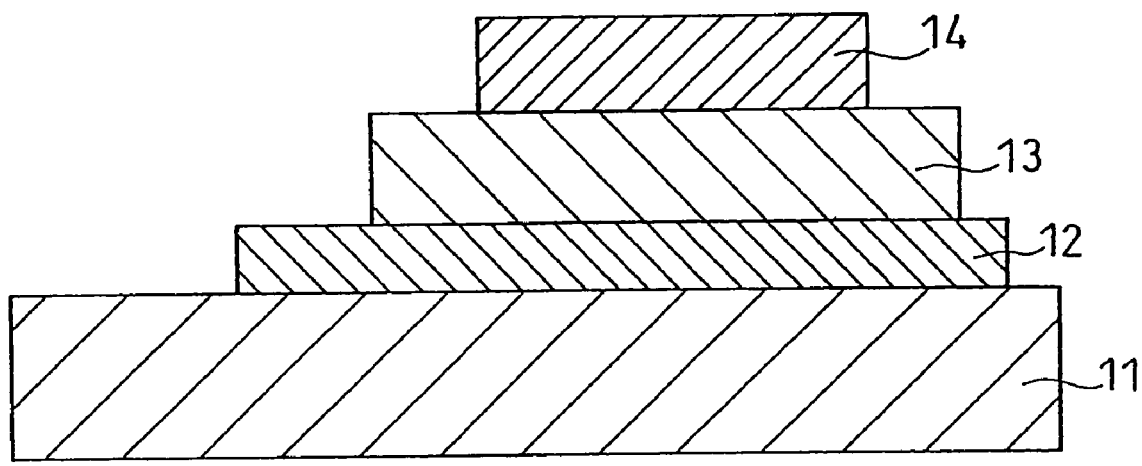
FIG. 1 is a schematic cross sectional view of a test cell used for the evaluation of solid electrolytes in Examples of the present invention.

The solid electrolyte of the present invention is composed of Li (lithium), O (oxygen), N (nitrogen), and at least one element M selected from the group consisting of Si (silicon), B (boron), Ge (germanium), Al (aluminum), C (carbon), Ga (gallium) and S (sulfur).

For example, the solid electrolyte can be composed of a nitride of lithium oxyacid salt containing the element M. The nitride of lithium oxyacid salt is obtained by partially substituting nitrogen for oxygen of a lithium oxyacid salt.

The solid electrolyte of the present invention is represented by the general formula $Li_xMO_yN_z$, where M is at least one element selected from the group consisting of Si, B, Ge, Al, C, Ga and S, and where x, y and z respectively satisfy x=0.6 to 5.0, y=1.050 to 3.985, and z=0.01 to 0.50. Note that x, y and z respectively represent the atomic ratio of Li to the element M, that of O to the same and that of N to the same.

When lithium phosphorus oxynitride, which is a conventionally used solid electrolyte, is allowed to stand in a wet atmosphere, it will readily react with water, which significantly reduces the ion conductivity. This is because some proportion of P (phosphorus) contained in the lithium phosphorus oxynitride reacts with water present in the atmosphere, and is reduced from a valence of +5.

The solid electrolyte of the present invention, on the other hand, contains the element M capable of thermodynamically forming a stabler bond with oxygen than a bonding state between phosphorus and oxygen in the lithium phosphorus oxynitride. This stabilizes the structure of the solid electrolyte and prevents the ion conductivity of the solid electrode from decreasing in a wet atmosphere.

In the above general formula, when z is 0.01 to 0.50, high ion conductivity can be obtained, and the decrease of ion conductivity due to storage in a wet atmosphere is prevented. When z is less than 0.01, high ion conductivity is hardly retained. Conversely, when z is above 0.50, the framework structure of the solid electrolyte will be damaged, and the ion conductivity is likely to decrease. The use of such solid electrolyte having decreased ion conductivity in an all solid state battery increases the resistance of the solid electrolyte, which significantly impairs charge/discharge characteristics. More preferably, z is 0.1 to 0.5. The conductive channels of lithium ion increase by causing a structural distortion of the solid electrolyte.

The composition of the solid electrolyte varies according to the kind of the element M used. In other words, x, y and z in the above general formula depend on the composition or type of the lithium oxyacid salt used as the raw material. Accordingly, x is in a range of 0.6 to 5.0 and y is in a range of 1.050 to 3.985.

The above-described solid electrolyte may further contain an element other than those listed above as long as the effect of the present invention is not impaired.

The solid electrolyte of the present invention can be obtained by, for example, partially replacing oxygen atoms of a lithium oxyacid salt with nitrogen atoms.

When the lithium oxyacid salt is $LiBiO_2$, $LiAlO_2$ or $LiGaO_2$, in other words, when M is Bi, Al or Ga in the previously mentioned general formula, it is preferred that x be 0.6 to 1.0, y be 1.050 to 1.985 and z be 0.01 to 0.50.

When the lithium oxyacid salt is $Li_2SiO_3$, $Li_2GeO_3$ or $Li_2CO_3$, in other words, when M is Si, Ge or C in the previously described general formula, it is preferred that x be 1.6 to 2.0, y be 2.050 to 2.985 and z be 0.01 to 0.50.

When the lithium oxyacid salt is $Li_2SO_4$, in other words, when M is S in the previously described general formula, it is preferred that x be 1.6 to 2.0, y be 3.050 to 3.985 and z be 0.01 to 0.50.

When the lithium oxyacid salt is $Li_3BiO_3$, in other words, when M is Bi in the previously described general formula, it is preferred that x be 2.6 to 3.0, y be 2.050 to 2.985 and z be 0.01 to 0.50.

When the lithium oxyacid salt is $Li_4SiO_4$ or $Li_4GeO_4$, in other words, when M is Si or Ge in the previously described general formula, it is preferred that x be 3.6 to 4.0, y be 3.050 to 3.985 and z be 0.01 to 0.50.

When the lithium oxyacid salt is $Li_5AlO_4$, in other words, when M is Al in the previously described general formula, it is preferred that x be 4.6 to 5.0, y be 3.050 to 3.985 and z be 0.01 to 0.50.

The solid electrolyte of the present invention is preferably a thin film. The thickness thereof can be appropriately adjusted, and the preferred thickness is 0.1 to 10 μm.

The solid electrolyte of the present invention may be either crystalline or amorphous.

As the method for producing the solid electrolyte of the present invention, similar to the method for producing a conventional solid electrolyte, i.e., lithium phosphorus oxynitride, for example, a thin film forming technique using a vacuum apparatus can be used. It is needless to say that a method other than this can also be used.

Examples of the method for forming a thin film include sputtering method in which a target is sputtered using nitrogen ($N_2$) by means of a magnetron or high frequency and a combined method of vapor deposition method and ion beam irradiation for introducing nitrogen ions. Examples of the vapor deposition method include resistance heating vapor deposition method in which vapor deposition is performed by heating a vapor deposition source using a resistance; electron beam vapor deposition method in which vapor deposition is performed by heating a vapor deposition source using an electron beam; and laser ablation method in which vapor deposition is performed by heating a vapor deposition source using a laser. In the vapor deposition, the above-listed lithium oxyacid salts are used as the target or vapor deposition source.

When the solid electrolyte is produced by using two different lithium oxyacid salts or more, two different methods may be combined such as the combined method of resistance heating vapor deposition method and electron beam vapor deposition method or the combined method of resistance heating vapor deposition method and laser ablation method.

Two different lithium oxyacid salts or more can be used as a single target or a single vapor deposition source. A mixture obtained by mixing two different lithium oxyacid salts or more at a predetermined ratio can be used as the target or vapor deposition source.

As the target or vapor deposition source, other than the above-listed lithium oxyacid salts, a mixture of $Li_2O$ and a lithium oxyacid salt or a mixture of $Li_2O$ and any of $SiO_2$, $Bi_2O_3$, $GeO_2$, $Al_2O_3$ and $Ga_2O_3$ can be used.

The all solid state battery of the present invention can be obtained by using the above-described solid electrolyte.

Figure 2:
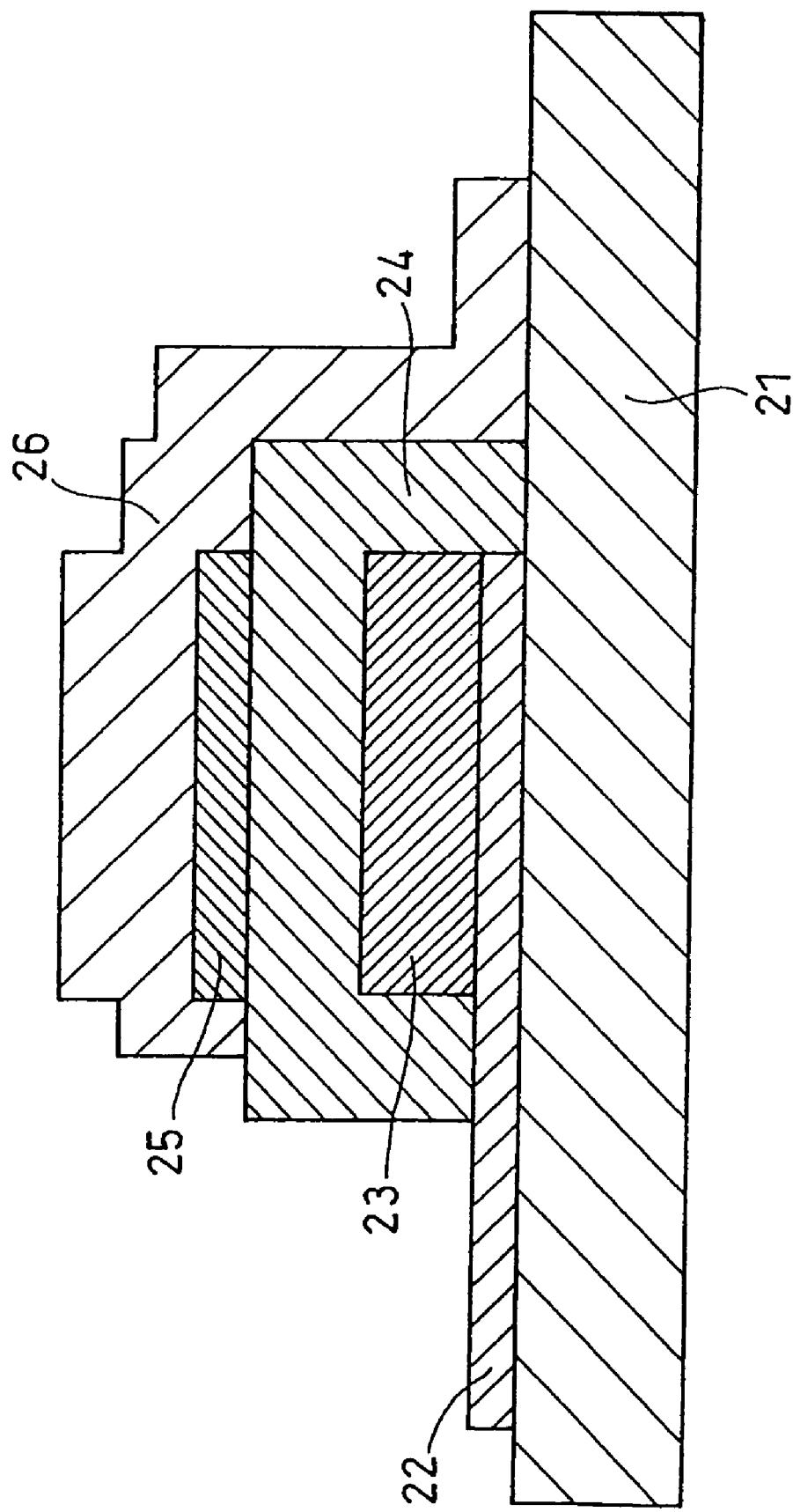
FIG. 2 is a schematic cross sectional view of an all solid state battery in Examples of the present invention.

As an example of the all solid state battery using the solid electrolyte of the present invention, FIG. 2 shows a schematic cross sectional view of an all solid state thin film lithium secondary battery.

The all solid state thin film lithium secondary battery comprises a base plate 21, and a first current collector 22, a first electrode 23, a solid electrolyte 24 of the present invention, a second electrode 25 and a second current collector 26 which are formed on the base plate 21. In this case, the first electrode serves as the positive electrode layer, and the second electrode serves as the negative electrode layer. However, the first electrode may serve as the negative electrode layer, and the second electrode may serve as the positive electrode layer.

This battery can be obtained by laminating, on the base plate 21, the first current collector 22, the first electrode 23, the solid electrolyte 24, the second electrode 25, and the second current collector 26 in this order using a thin film forming method using a vacuum apparatus. It is needless to say that a method other than the thin film forming method using a vacuum apparatus can be used. Further, a resin or aluminum laminate film may be placed on the second current collector 26 to form a protection layer.

As the base plate 21, there can be used an electrically insulating base plate such as alumina, glass or polyimide film; a semiconductor base plate such as silicon; or an electron conductive base plate such as aluminum or copper. In the case of using the electron conductive base plate, in order to prevent the first current collector 22 from electrically connecting to the second current collector 26, an electrically insulating material is placed on at least either of the interface between the first current collector 22 and the base plate 21 or the interface between the second current collector 26 and the base plate 21. Because the base plate preferably has a low surface roughness, it is effective to use a plate having a mirror-finished surface or the like.

As the first current collector 22 placed on the base plate 21, for example, there can be used an electron conductive material such as platinum, platinum/palladium, gold, silver, aluminum, copper or ITO (indium-tin oxide film). Other than those listed above, any material having electron conductivity and unreactive with the first electrode 23 can be used as the current collector.

As for the method for producing the first current collector 22, there can be used sputtering method, resistance heating vapor deposition method, ion beam vapor deposition method or electron beam vapor deposition method. When the base plate 21 is composed of an electron conductive material such as aluminum, copper or stainless steel, the first current collector may 22 be omitted.

The first electrode (positive electrode layer) 23 is preferably composed of, for example, a positive electrode material for lithium secondary batteries such as lithium cobaltate ($LiCoO_2$), lithium nickelate ($LiNiO_2$) or lithium manganate ($LiMn_2O_4$), and a transition metal oxide such as vanadium oxide ($V_2O_5$), molybdenum oxide ($MoO_3$) or titanium sulfide ($TiS_2$). Besides those listed above, any material that can be used for a positive electrode for lithium secondary batteries can be used for the first electrode 23.

As for the method for producing the first electrode (positive electrode layer) 23, there can be used sputtering method, resistance heating vapor deposition method, ion beam vapor deposition method, electron beam vapor deposition method or laser ablation method.

As the solid electrolyte 24, the solid electrolyte of the present invention described previously is used.

The second electrode (negative electrode layer) 25 is preferably composed of, for example, a negative electrode material for lithium secondary batteries such as a carbon material (C) including graphite or hard carbon, any of an alloy containing tin (Sn), lithium cobalt nitride (LiCoN), lithium metal (Li) or a lithium alloy (e.g. LiAl). Other than those listed above, any material that can be used as a negative electrode for lithium secondary batteries can be used for the second electrode 25.

As for the method for producing the second electrode (negative electrode layer) 25, there can be used sputtering method, resistance heating vapor deposition method, ion beam vapor deposition method, electron beam vapor deposition method or laser ablation method.

As the second current collector 26, the materials listed in the case of the first current collector 22 can be used. Similarly, as the method for producing the second current collector 26, the methods listed in the case of the first current collector 22 can be used.

It is also possible to stack a plurality of such all solid state batteries to form a stacked battery.

Although the embodiments have been described for the case of using an all solid state thin film lithium secondary battery as an example of the all solid state battery of the present invention, it should be understood that the present invention is not limited thereto.

Hereinafter, the present invention will be described using examples, but it should be understood that the present invention is not limited thereto.

EXAMPLES 1 TO 10

Test cells were produced by the following procedure so as to evaluate solid electrolytes.

In the first step, at a predetermined position on a silicon base plate 11 having a mirror-finished surface having been oxidized and a surface roughness of not greater than 30 nm was placed a metal mask having an opening with a size of 20 mm×10 mm, after which rf magnetron sputtering method was performed to form a film composed of platinum. Thereby, a platinum current collector layer 12 having a thickness of 0.5 µm was obtained.

Subsequently, in the second step, on the thus-obtained platinum current collector layer 12 was placed a metal mask having an opening with a size of 15 mm×15 mm, after which rf magnetron sputtering method was performed to form a solid electrolyte thin film composed of nitride of lithium oxyacid salt shown in Table 1. Thereby, a solid electrolyte layer 13 having a thickness of 1.0 µm was obtained.

In the rf magnetron sputtering method, each lithium oxyacid salt shown in Table 1 was used as the target. The sputtering gas used here was nitrogen ($N_2$). The conditions for the rf magnetron sputtering method were as follows. The chamber internal pressure was 2.7 Pa. The amount of gas introduced was 10 sccm. The sputtering time was two hours. The high frequency power irradiated to the target was 200 W.

In the third step, on the above-obtained solid electrolyte layer 13 was placed a metal mask having an opening with a size of 10 mm×10 mm such that the mask did not extend beyond the solid electrolyte layer 13, after which rf magnetron sputtering method was performed to form a film composed of platinum. Thereby, a platinum current collector layer 14 having a thickness of 0.5 µm was obtained.

COMPARATIVE EXAMPLE 1

In the second step, with the use of lithium orthophosphate as the target, a solid electrolyte having a thickness of 1.0 µm was obtained by forming a thin film composed of lithium phosphorus oxynitride ($Li_{2.8}PO_{3.45}N_{0.3}$) in the same manner as in Example 1. A test cell was produced in the same manner as in Example 1 except for this second step.

[Evaluation]

In order to evaluate the solid electrolyte films in terms of water resistance, the test cells of Examples 1 to 10 and Comparative Example 1 produced above were stored in a controlled chamber with a humidity of 50% and a temperature of 20° C. for two weeks. For each of the test cells, alternating current impedance was measured immediately after the production and two weeks after the storage, and the change in ion conductivity with time was checked. The alternating current impedance measurement was performed with an equilibrium voltage of zero, an amplitude of the applied voltage of ±10 mV and a frequency of $10^5$ to 0.1 Hz. Ion conductivity was determined from the result of the alternating current impedance measurement.

The evaluation results are shown in Table 1. Note that the ion conductivity is expressed in relative value with the ion conductivity obtained from the result of the impedance measurement done immediately after the production of the test cells set at 100.

TABLE 1

| | | | Ion conductivity | |
| --- | --- | --- | --- | --- |
| | Lithium oxyacid salt used as target | Solid electrolyte layer | Immediately after production | 2 weeks after storage |
| Ex. 1 | $Li_4SiO_4$ | $Li_{3.8}SiO_{3.45}N_{0.3}$ | 100.00 | 86.82 |
| Ex. 2 | $Li_2SiO_3$ | $Li_{1.8}SiO_{2.45}N_{0.3}$ | 100.00 | 83.98 |
| Ex. 3 | $LiBO_2$ | $Li_{0.8}BO_{1.45}N_{0.3}$ | 100.00 | 77.33 |
| Ex. 4 | $Li_2GeO_3$ | $Li_{1.8}GeO_{2.45}N_{0.3}$ | 100.00 | 72.03 |
| Ex. 5 | $Li_4GeO_4$ | $Li_{3.8}GeO_{3.45}N_{0.3}$ | 100.00 | 86.91 |
| Ex. 6 | $LiAlO_2$ | $Li_{0.8}AlO_{1.45}N_{0.3}$ | 100.00 | 79.86 |
| Ex. 7 | $Li_5AlO_4$ | $Li_{4.8}AlO_{3.45}N_{0.3}$ | 100.00 | 84.47 |
| Ex. 8 | $Li_2CO_3$ | $Li_{1.8}CO_{2.45}N_{0.3}$ | 100.00 | 74.51 |
| Ex. 9 | $LiGaO_2$ | $Li_{0.8}GaO_{1.45}N_{0.3}$ | 100.00 | 79.58 |
| Ex. 10 | $Li_2SO_4$ | $Li_{1.8}SiO_{3.45}N_{0.3}$ | 100.00 | 73.60 |
| Comp. Ex. 1 | $Li_3PO_4$ | $Li_{2.8}PO_{3.45}N_{0.3}$ | 100.00 | 14.29 |

Table 1 indicates that, for the solid electrolytes of Examples 1 to 10, the decrease of ion conductivity was prevented even after storage in the wet atmosphere. However, for the solid electrolyte of Comparative Example 1 without a nitride of lithium oxyacid salt decreased significantly after storage.

The foregoing illustrates that the deterioration of the solid electrolytes was prevented in Examples 1 to 10.

EXAMPLES 11 TO 23

Test cells were produced in the same manner as in Example 1 except that, in the second step, the mixtures of lithium oxyacid salts (at a molar ratio of 1:1) shown in Table 2 were used as the target to produce the solid electrolyte layers composed of nitride of lithium oxyacid salt shown in Table 2.

The test cells were then evaluated in the same manner as in Example 1. The evaluation results are shown in Table 2. Note that the ion conductivity is expressed in relative value with the ion conductivity obtained immediately after the production of the test cells set at 100.

TABLE 2

| | Lithium oxyacid salts used as target | Solid electrolyte layer | Ion conductivity | |
|---|---|---|---|---|
| | | | Immediately after production | 2 weeks after storage |
| Ex. 11 | $Li_4SiO_4$, $LiBO_2$ | $Li_{2.3}Si_{0.5}B_{0.5}O_{2.45}N_{0.3}$ | 100.00 | 85.08 |
| Ex. 12 | $Li_4SiO_4$, $Li_4GeO_2$ | $Li_{3.8}Si_{0.5}Ge_{0.5}O_{3.45}N_{0.3}$ | 100.00 | 90.05 |
| Ex. 13 | $Li_4SiO_4$, $Li_2CO_3$ | $Li_{2.8}Si_{0.5}C_{0.5}O_{2.95}N_{0.3}$ | 100.00 | 83.62 |
| Ex. 14 | $Li_4SiO_4$, $Li_2SO_4$ | $Li_{2.8}Si_{0.5}S_{0.5}O_{3.45}N_{0.3}$ | 100.00 | 83.15 |
| Ex. 15 | $LiBO_2$, $Li_4GeO_2$ | $Li_{2.3}B_{0.5}Ge_{0.5}O_{2.45}N_{0.3}$ | 100.00 | 85.13 |
| Ex. 16 | $LiBO_2$, $Li_5AlO_4$ | $Li_{2.8}B_{0.5}Al_{0.5}O_{2.45}N_{0.3}$ | 100.00 | 83.86 |
| Ex. 17 | $LiBO_2$, $Li_2CO_3$ | $Li_{1.3}B_{0.5}C_{0.5}O_{1.95}N_{0.3}$ | 100.00 | 78.70 |
| Ex. 18 | $LiBO_2$, $LiGaO_2$ | $Li_{0.8}B_{0.5}Ga_{0.5}O_{1.45}N_{0.3}$ | 100.00 | 81.33 |
| Ex. 19 | $LiBO_2$, $Li_2SO_4$ | $Li_{1.3}B_{0.5}S_{0.5}O_{2.45}N_{0.3}$ | 100.00 | 78.23 |
| Ex. 20 | $Li_4GeO_4$, $Li_2CO_3$ | $Li_{2.8}Ge_{0.5}C_{0.5}O_{2.95}N_{0.3}$ | 100.00 | 83.67 |
| Ex. 21 | $Li_4GeO_4$, $Li_2SO_4$ | $Li_{2.8}Ge_{0.5}S_{0.5}O_{3.45}N_{0.3}$ | 100.00 | 83.20 |
| Ex. 22 | $LiGaO_2$, $Li_5AlO_4$ | $Li_{2.8}Ga_{0.5}Al_{0.5}O_{2.45}N_{0.3}$ | 100.00 | 85.03 |
| Ex. 23 | $Li_2SO_4$, $Li_2CO_3$ | $Li_{1.8}S_{0.5}C_{0.5}O_{2.95}N_{0.3}$ | 100.00 | 76.77 |

Table 2 illustrates that, in Examples 11 to 23, the decrease of ion conductivity was prevented after storage in the wet atmosphere and the deterioration of the solid electrolytes was prevented.

In this example, although the molar ratio between two different lithium oxyacid salts was set to 1.1 to produce the nitrides of lithium oxyacid salt, the molar ratio is not limited thereto.

EXAMPLES 24 TO 27 AND COMPARATIVE EXAMPLES 2 TO 4

In order to evaluate the content of nitrogen in a nitride of lithium oxyacid salt, solid electrolytes were obtained by the following procedure.

Solid electrolyte layers shown in Table 3 were obtained in the same manner as in Example 1 except that, in the second step, lithium orthophosphate ($Li_4SiO_4$) was used as the target and the atomic ratio of nitrogen to silicon was varied in a range of 0.005 to 1.0 by adjusting the chamber internal pressure. Test cells were produced in the same manner as in Example 1 except for this second step.

The test cells were then evaluated in the same manner as in Example 1. The evaluation results are shown in Table 3. Note that ion conductivity is expressed in relative value with the ion conductivity obtained immediately after the production of the test cells set at 100. Further, the ion conductivity immediately after the production of the test cells is expressed in relative value with the ion conductivity of Example 26 in which the atomic ratio of nitrogen to silicon was 0.3 set at 100.

TABLE 3

| | Solid electrolyte layer | Ion conductivity | | |
|---|---|---|---|---|
| | | Immediately after production | 2 weeks after storage | Ion conductivity relative to that of Ex. 26 |
| Comp. Ex. 2 | $Li_{3.8}SiO_{3.89}N_{0.005}$ | 100.00 | 87.50 | 5.45 |
| Ex. 24 | $Li_{3.8}SiO_{3.89}N_{0.01}$ | 100.00 | 85.00 | 54.55 |
| Ex. 25 | $Li_{3.8}SiO_{3.75}N_{0.1}$ | 100.00 | 88.24 | 77.27 |
| Ex. 26 | $Li_{3.8}SiO_{3.45}N_{0.3}$ | 100.00 | 86.82 | 100.00 |
| Ex. 27 | $Li_{3.8}SiO_{3.15}N_{0.5}$ | 100.00 | 88.84 | 97.73 |
| Comp. Ex. 3 | $Li_{3.8}SiO_{3.0}N_{0.6}$ | 100.00 | 86.71 | 31.82 |
| Comp. Ex. 4 | $Li_{3.8}SiO_{2.4}N_{1.0}$ | 100.00 | 86.00 | 2.27 |

Table 3 indicates that, even when the content of nitrogen was changed in the nitrides of lithium orthophosphate, the decrease of ion conductivity after storage in the wet atmosphere was prevented. When comparisons were made among the test cells containing different content of nitrogen in terms of ion conductivity immediately after production, in Comparative Example 3 in which the atomic ratio of nitrogen to silicon in the nitride of lithium orthophosphate was 0.6, the ion conductivity decreased slightly. Further, in Comparative Examples 2 and 4 in which the atomic ratio of nitrogen was 0.005 and 1.0, respectively, the ion conductivity decreased significantly. This illustrates that, in Examples 24 to 27 in which the atomic ratio of nitrogen to silicon in the nitride of lithium orthophosphate was 0.01 to 0.5, excellent ion conductivity was obtained in the initial stage immediately after production and the decrease of ion conductivity due to storage in the wet atmosphere was prevented.

EXAMPLES 28 TO 37

In order to evaluate all solid state batteries using the solid electrolyte of the present invention, all solid state batteries having the structure shown in FIG. 2 were produced by the following procedure.

In the first step, at a predetermined position on a silicon base plate 11 having a mirror-finished surface having been oxidized and a surface roughness of not greater than 30 nm was placed a metal mask having an opening with a size of 20 mm×12 mm, after which rf magnetron sputtering method was performed to form a film composed of platinum. Thereby, a first current collector 22 having a thickness of 0.5 μm was obtained.

Subsequently, in the second step, on the thus-obtained first current collector 22 was placed a metal mask having an opening with a size of 10 mm×10 mm, after which rf magnetron sputtering method was performed to form a thin film composed of lithium cobaltate ($LiCoO_2$). Thereby, a first electrode (positive electrode layer) 23 having a thickness of 1.0 μm was obtained.

Subsequently, in the third step, on the above-obtained first electrode 23 was placed a metal mask having an opening with a size of 15 mm×15 mm, after which rf magnetron sputtering method was performed to form a thin film composed of nitride of lithium oxyacid salt shown in Table 4. Thereby, a solid electrolyte 24 having a thickness of 1.0 μm was obtained.

In the rf magnetron sputtering method, lithium oxyacid salts shown in Table 4 were used as the target. The sputtering gas used here was nitrogen ($N_2$). The conditions for the rf magnetron sputtering method were as follows. The chamber internal pressure was 2.7 Pa. The amount of gas introduced was 10 sccm. The sputtering time was two hours. The high frequency power irradiated to the target was 200 W.

In the forth step, on the above-obtained solid electrolyte 24 was placed a metal mask having an opening with a size of 10 mm×10 mm, after which resistance heating vapor deposition method was performed to form a thin film composed of lithium metal. Thereby, a second electrode (negative electrode layer) 25 having a thickness of 0.5 μm was obtained.

Further, in the fifth step, on the above-obtained second electrode 25 was placed a metal mask having an opening with a size of 20 mm×12 mm, after which rf magnetron sputtering method was performed to form a thin film composed of copper such that the thin film completely covered the negative electrode layer 25 while the thin film was not in contact with the first current collector 22. Thereby, a second current collector 26 having a thickness of 1.0 μm was obtained.

COMPARATIVE EXAMPLE 5

In the third step, with the use of lithium orthophosphate as the target, a solid electrolyte having a thickness of 1.0 μm was obtained by forming a thin film composed of lithium phosphorus oxynitride ($Li_{2.8}PO_{3.45}N_{0.3}$) in the same manner as in Example 31. A battery was produced in the same manner as in Example 30 except for this third step.

[Evaluation]

In order to evaluate the solid electrolyte films in terms of water resistance, the all solid state batteries of Examples 28 to 37 and Comparative Example 5 produced above were stored in a controlled chamber with a relative humidity of 50% and a temperature of 20° C. for two weeks. For each of the batteries, alternating current impedance was measured immediately after the production and two weeks after the storage. The alternating current impedance measurement was performed with an equilibrium voltage of zero, an amplitude of the applied voltage of ±10 mV and a frequency of $10^5$ to 0.1 Hz. Internal impedance was determined from the result of the alternating current impedance measurement.

The results of the internal impedance measurement are shown in Table 4. Note that the internal impedance is expressed in relative value with the internal impedance obtained immediately after the production of the batteries set at 100.

TABLE 4

| | Lithium oxyacid salt used as target | Solid electrolyte layer | Internal impedance | |
|---|---|---|---|---|
| | | | Immediately after production | 2 weeks after storage |
| Ex. 28 | $Li_4SiO_4$ | $Li_{3.8}SiO_{3.45}N_{0.3}$ | 100.00 | 115.18 |
| Ex. 29 | $Li_2SiO_3$ | $Li_{1.8}SiO_{2.45}N_{0.3}$ | 100.00 | 119.07 |
| Ex. 30 | $LiBO_2$ | $Li_{0.8}BO_{1.45}N_{0.3}$ | 100.00 | 129.31 |

TABLE 4-continued

| | Lithium oxyacid salt used as target | Solid electrolyte layer | Internal impedance | |
|---|---|---|---|---|
| | | | Immediately after production | 2 weeks after storage |
| Ex. 31 | $Li_2GeO_3$ | $Li_{1.8}GeO_{2.45}N_{0.3}$ | 100.00 | 138.84 |
| Ex. 32 | $Li_4GeO_4$ | $Li_{3.8}GeO_{3.45}N_{0.3}$ | 100.00 | 115.06 |
| Ex. 33 | $LiAlO_2$ | $Li_{0.8}AlO_{1.45}N_{0.3}$ | 100.00 | 125.22 |
| Ex. 34 | $Li_5AlO_4$ | $Li_{4.8}AlO_{3.45}N_{0.3}$ | 100.00 | 118.39 |
| Ex. 35 | $Li_2CO_3$ | $Li_{1.8}CO_{2.45}N_{0.3}$ | 100.00 | 134.21 |
| Ex. 36 | $LiGaO_2$ | $Li_{0.8}GaO_{1.45}N_{0.3}$ | 100.00 | 125.65 |
| Ex. 37 | $Li_2SO_4$ | $Li_{1.8}SO_{3.45}N_{0.3}$ | 100.00 | 135.87 |
| Comp. Ex. 5 | $Li_3PO_4$ | $Li_{2.8}PO_{3.45}N_{0.3}$ | 100.00 | 700.00 |

As can be seen from Table 4, for the batteries of Examples 28 to 37, any significant change was observed in internal impedance and ion conductivity even when the batteries were stored in the wet atmosphere. For the battery of Comparative Example 5, however, the solid electrolyte deteriorated after the storage, and therefore the internal impedance increased significantly and the ion conductivity decreased.

This indicates that the deterioration of the solid electrolytes was prevented in Examples 28 to 37.

INDUSTRIAL APPLICABILITY

As described above, according to the present invention, it is possible to provide a solid electrolyte that hardly deteriorates in a wet atmosphere. Such solid electrolyte can be used in an all solid state battery.

The invention claimed is:

1. A solid electrolyte represented by a general formula:

$$Li_xMO_yN_z,$$

where M is at least one element selected from the group consisting of Si, B, Ge, Al, C, Ga and S, and x, y and z respectively satisfy x=1.6 to 2.0 or 4.6 to 5.0; y=2.050 to 2.985 or 3.050 to 3.985, and z=0.01 to 0.50.

2. The solid electrolyte in accordance with claim 1, wherein said formula satisfies x=1.6 to 2.0, y=2.050 to 2.985 and z=0.01 to 0.50.

3. The solid electrolyte in accordance with claim 1, wherein said formula satisfies x=1.6 to 2.0, y=3.050 to 3.985 and z=0.01 to 0.50.

4. The solid electrolyte in accordance with claim 1, wherein said formula satisfies x=4.6 to 5.0, y=3.050 to 3.985 and z=0.01 to 0.50.

5. An all solid state battery comprising: a positive electrode; a negative electrode; and the solid electrolyte in accordance with claim 1 disposed between said positive electrode and said negative electrode.

* * * * *